United States Patent
Aguilar Marsillach et al.

(10) Patent No.: US 12,157,493 B2
(45) Date of Patent: Dec. 3, 2024

(54) ROBUST TRAJECTORY PLANNING USING DATA-DRIVEN REACHABILITY CORRIDORS

(71) Applicant: GM Global Technology Operations LLC, Detroit, MI (US)

(72) Inventors: Daniel Aguilar Marsillach, Detroit, MI (US); Sayyed Rouhollah Jafari Tafti, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 244 days.

(21) Appl. No.: 18/063,354

(22) Filed: Dec. 8, 2022

(65) Prior Publication Data
US 2024/0190458 A1    Jun. 13, 2024

(51) Int. Cl.
*B60W 60/00*    (2020.01)
*G06V 10/80*    (2022.01)
*G06V 20/56*    (2022.01)

(52) U.S. Cl.
CPC ........... *B60W 60/001* (2020.02); *G06V 10/80* (2022.01); *G06V 20/56* (2022.01); *B60W 2420/408* (2024.01); *B60W 2555/20* (2020.02)

(58) Field of Classification Search
CPC ......... B60W 60/001; B60W 2420/408; B60W 2555/20; B60W 50/00; G06V 10/80; G06V 20/56
See application file for complete search history.

(56) References Cited

U.S. PATENT DOCUMENTS

| | | | |
|---|---|---|---|
| 10,146,224 B2 | 12/2018 | Tafti et al. | |
| 10,725,470 B2 | 7/2020 | Mahabadi et al. | |
| 11,364,899 B2* | 6/2022 | Vignard | B60W 30/09 |
| 11,727,671 B1* | 8/2023 | Chen | G06V 20/46 |
| | | | 382/154 |
| 2018/0281785 A1* | 10/2018 | Berntorp | B60W 30/09 |
| 2019/0072965 A1* | 3/2019 | Zhang | G08G 1/166 |
| 2021/0397194 A1* | 12/2021 | Aubert | G01C 21/3446 |

(Continued)

OTHER PUBLICATIONS

Alsterda et al., "Contingency Model Predictive Control for Linear Time-Varying Systems," ArXiv abs/2102.12045, Feb. 2021.
(Continued)

*Primary Examiner* — Kira Nguyen
(74) *Attorney, Agent, or Firm* — Vivacqua Crane, PLLC

(57) ABSTRACT

A vehicle trajectory planning system includes a perception system of a host vehicle collecting information from multiple sources and communicating with a computer. A fusion module fuses scene information from a map and perception items identified by the perception system. A behavior planning module receives an output of the fusion module and produces a host vehicle baseline trajectory. A trajectory and motion planning module receives an output of the fusion module in parallel with the behavior planning module. The trajectory and motion planning module determines a reference trajectory and operation corridor for a host vehicle. A disturbance and reachability refiner module receives an output of the trajectory and motion planning module including the reference trajectory and operation corridor. An algorithm is applied to adjust and re-plan the host vehicle baseline trajectory to be robust to a range of inclement weather conditions.

20 Claims, 10 Drawing Sheets

(56) References Cited

U.S. PATENT DOCUMENTS

2022/0055651 A1* 2/2022 Baric ..................... G05D 1/646
2023/0047354 A1* 2/2023 Wang ................ B60W 50/0097
2023/0079202 A1* 3/2023 You ..................... G05D 1/0212
701/25

OTHER PUBLICATIONS

Borrelli et al., "Predictive Control for Linear and Hybrid Systems," Cambridge University Press, 2017, pp. 183-209, Cambridge, doi:10.1017/9781139061759.
Jalalmaab et al., "Model predictive path planning with time-varying safety constraints for highway autonomous driving," 2015 International Conference on Advanced Robotics (ICAR), 2015, pp. 213-217, doi: 10.1109/ICAR.2015.7251458.
Kordani et al., "Effect of Adverse Weather Conditions on Vehicle Braking Distance of Highways," Civil Engineering Journal, Jan. 2018, pp. 46-57, vol. 4.
Peng et al, "Lane-Change Model and Tracking Control for Autonomous Vehicles on Curved Highway Sections in Rainy Weather," Journal of Advanced Transportation 2020, Nov. 25, 2020, pp. 1-15, vol. 2020, Article ID 8838878.
Tas et al., "Limited Visibility and Uncertainty Aware Motion Planning for Automated Driving."Vehicles Symposium (IV), Jun. 2018, pp. 1171-1178, Changshu-Suzhou China.

* cited by examiner

ROBUST TRAJECTORY PLANNING USING DATA-DRIVEN REACHABILITY CORRIDORS

INTRODUCTION

The present disclosure relates to systems and methods to generate and refine vehicle trajectories of vehicles including autonomous vehicles.

Current vehicle control planners or computers generate baseline vehicle trajectories based on known road conditions. Current behavior-planning methods are primarily designed for normal conditions including dry road conditions and utilize kinematic or simple modeling. Current behavior-planning methods are also targeted for rapid planning and computational efficiency to minimize computational time.

These behavior-planning methods and the known systems that implement the baseline trajectories therefore lack the ability to adapt for changing road conditions, particularly for the effects of changing and inclement weather which are computationally intensive. Current planning systems may include the capability to consider a single operating condition but are not robust enough and do not have the capability of considering the feasibility of conducting a vehicle maneuver over an interval of time or distance when road conditions and the driving environment may be actively changing. Current control systems adjust and perform lower-level re-plans around the baseline trajectory therefore the behavior planner is not proactive or predictive with regard to actual vehicle dynamics in degraded environmental conditions.

Thus, while current systems and methods to generate vehicle trajectories achieve their intended purpose, there is a need for a new and improved system and method to generate and actively refine vehicle trajectories.

SUMMARY

According to several aspects, a vehicle trajectory planning system includes a perception system of a host vehicle collecting information from multiple sources and communicating with a computer. A fusion module fuses scene information from a map and perception items identified by the perception system. A behavior planning module receives an output of the fusion module and produces a host vehicle baseline trajectory. A trajectory and motion planning module receives the output of the fusion module in parallel with the behavior planning module. The trajectory and motion planning module determines a reference trajectory and an operation corridor for a host vehicle. A disturbance and reachability refiner module receives an output of the trajectory and motion planning module including the reference trajectory and the operation corridor. An algorithm is applied to adjust and re-plan the host vehicle baseline trajectory to be robust to a range of exogenous disturbances acting on the host vehicle, which include but are not limited to inclement weather conditions, road surface variations, wind and the like.

In another aspect of the present disclosure, a relevant data planning module communicating with an offline source defines a database to retrieve and calculate set disturbance information and to communicate with the disturbance and reachability refiner module.

In another aspect of the present disclosure, an offline data-driven reachable set function learning module receives input data from the relevant data planning module which includes set disturbance information, the offline data-driven reachable set function learning module using supervised learning algorithms to generate or learn a function approximating computations performed using the supervised learning algorithms; wherein an output of the offline data-driven reachable set function learning module defines a mathematical object function ported into the host vehicle for real-time deployment.

In another aspect of the present disclosure, a refined trajectory and a refined operation corridor is produced by combined online and offline data received by the disturbance and reachability refiner module, the refined trajectory and the refined operation corridor being forwarded to the computer, the computer communicating with the fusion module to further aid in processing of the scene information.

In another aspect of the present disclosure, a baseline goal set receives the vehicle baseline trajectory and incorporates data including roadway intersections.

In another aspect of the present disclosure, a reachability-based corridor module has the baseline goal set loaded into the reachability-based corridor module and wherein a collision checking logic is flipped to maintain the host vehicle inside of a roadway operation corridor. The reachability-based corridor module incorporates multiple different vehicle speeds, multiple different friction coefficients between the host vehicle and a roadway and effects of unmodeled disturbances including wind and rain.

In another aspect of the present disclosure, a corridor combining module has an output of the reachability-based corridor module together with the reference trajectory and the operation corridor fed into the corridor combining module, the corridor combining module evaluating vehicle travel corridors to determine if travel is dynamically feasible and determining if an operation corridor data is robust to impacts of exogenous disturbances under consideration including inclement weather.

In another aspect of the present disclosure, a trajectory refinement module receives output data from the corridor combining module to refine the baseline trajectory using the reference trajectory and the operation corridor and applying an output of the corridor combining module. A refined trajectory and a refined operation corridor output by the corridor combining module is fed to the computer wherein the algorithm applied to adjust and re-plan the host vehicle baseline trajectory combines operation corridors with a reachability corridor in real-time.

In another aspect of the present disclosure, a learning framework enabling computation of reach sets online uses a function approximator that considers linear and nonlinear tire dynamics.

In another aspect of the present disclosure, the multiple sources include a vehicle camera and at least one sensor defining a radio detection and ranging (RADAR) sensor and a light detection and ranging (LIDAR) sensor.

According to several aspects, a method to apply data driven reachability corridors in vehicle trajectory planning, comprises: determining a path for a host vehicle to take; calculating an ideal path incorporating a baseline trajectory from an initial host vehicle start time $t_0$ to a completion of a path change at a final time $t_f$; calculating multiple feasible trajectories of the host vehicle; defining a guidance tube around the ideal path incorporating the multiple feasible trajectories at multiple points around the ideal path considering multiple distances to proximate vehicles; performing an online real-time calculation by a computer to identify multiple baseline goal sets; and forming a reach corridor within which the host vehicle dynamically reaches a desired target set of the multiple baseline goal sets including wind and local friction variations and working from the final time $t_f$ back to the host vehicle start time $t_0$ defining a host vehicle start state.

In another aspect of the present disclosure, the method further includes generating a learning module for the reach corridor using reach tools to produce a ground-truth and a ground truth dataset by the computer.

In another aspect of the present disclosure, the method further includes initially defining the baseline goal sets around a final state of the ideal path, then working computations for the reach corridor backwards to the initial state of the host vehicle at the start time $t_0$.

In another aspect of the present disclosure, the method further includes using ground-truth input/output sets to perform supervised learning including a supervised learning function connected to physics-informed learning, accomplished using sequential updates and computing steps to update a function approximator set of parameters.

In another aspect of the present disclosure, the method further includes combining the reach corridor and an operation corridor at an intersection of the guidance tube with a disturbance incorporated reach corridor to provide robustness to mismodeling of dynamics, including disturbances or perturbations acting on the host vehicle.

In another aspect of the present disclosure, the method further includes: performing a minimally invasive trajectory refinement retaining dynamic feasibility properties via the backwards reach analysis; and identifying a refined trajectory by minimizing error with respect to the ideal path based on samples at discrete points corresponding to time steps of the new operation corridor.

In another aspect of the present disclosure, the method further includes computing the baseline goal sets and multiple reachable sets using $f^{\theta^*}(\bullet)$ online in real-time accounting for a disturbance set $W$ after training and learning $f^{\theta^*}(\bullet)$ offline to account for disturbances including wind and local friction variations occurring during motion of the host vehicle from the start time $t_0$ to the final time $t_f$.

According to several aspects, a method to apply data driven reachability corridors in vehicle trajectory planning, comprises: calculating an ideal path for a host vehicle incorporating a baseline trajectory in a host vehicle computer; loading an output of a trajectory and motion planning module including a reference trajectory and operation corridor into a disturbance and reachability refiner module; applying data-driven reachable set computations by learning set mappings offline using supervised learning; applying an approximating function online; applying the reference trajectory and operation corridor to compute a reachability corridor for the host vehicle to remain inside of during a maneuver of the host vehicle; and updating the reachability corridor while constraining the host vehicle computer based on local disturbances using the disturbance and reachability refiner module including changing road conditions, inclement weather and roadway disturbances.

In another aspect of the present disclosure, the method further includes: retrieving and calculating set disturbance information from offline sources including a relevant data planning module in communication with a database; generating a supervised learning function and communicating the supervised learning function to the disturbance and reachability refiner module; and providing input data to an offline data-driven reachable set function learning module from the relevant data planning module.

In another aspect of the present disclosure, the method further includes: applying ground-truth input/output sets to perform supervised learning including a supervised learning function which is connected to physics-informed learning using sequential updates; computing steps to update a function approximator; and conducting inclement weather reachability corridor training offline given a sampling time and a horizon of interest and learning to approximate reachable dataset computations offline based on input and output pairs or demonstrations.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
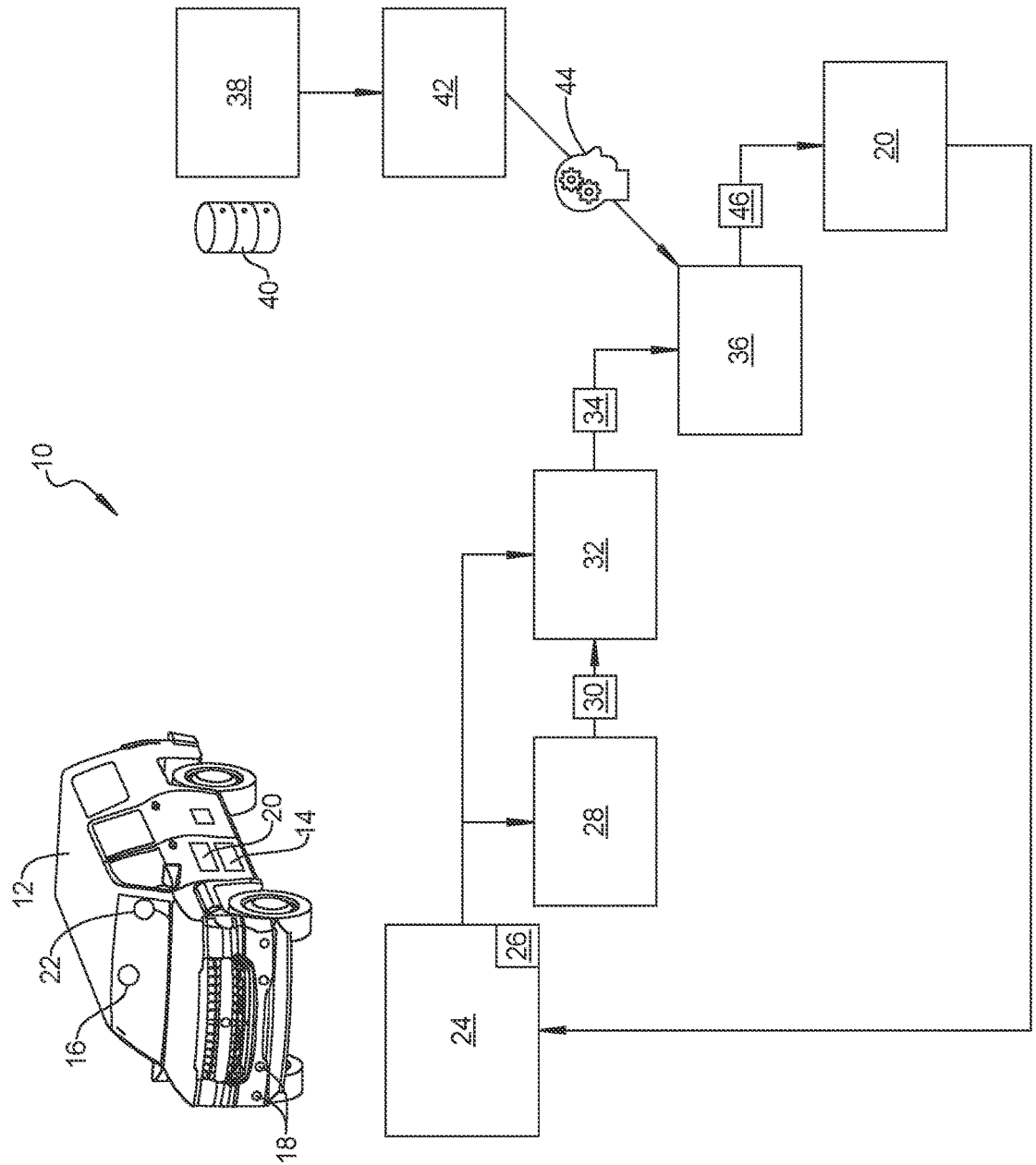
FIG. 1 is a flow diagram of a vehicle trajectory planning system according to an exemplary aspect.

Referring to FIG. 1, a vehicle trajectory planning system 10 provides vehicle trajectory planning for a host vehicle 12 having a perception system 14 which collects data from multiple sources. The multiple sources include a vehicle camera 16 and at least one sensor 18 which may include for example a radio detection and ranging (RADAR) sensor and a light detection and ranging (LIDAR) sensor. Outputs from the vehicle camera 16 and the at least one sensor 18 are forwarded to the perception system 14. The perception system 14 communicates with a computer 20 and data may be output to a vehicle user 22 which may include a vehicle driver and one or more passengers of the host vehicle 12.

The vehicle trajectory planning system 10 includes system design and logic having a fusion module 24 which fuses scene information from a map 26 and perception items identified by the perception system 14 of the host vehicle 12. An output of the fusion module 24 is fed to a behavior planning module 28 which produces a baseline trajectory 30 of the host vehicle 12 which is forwarded to a trajectory and motion planning module 32 which also receives an output of the fusion module 24 in parallel with the behavior planning module 28. The trajectory and motion planning module 32 determines a reference trajectory and operation corridor 34 discussed in greater detail below in reference to FIG. 2 for the host vehicle 12.

Figure 2:
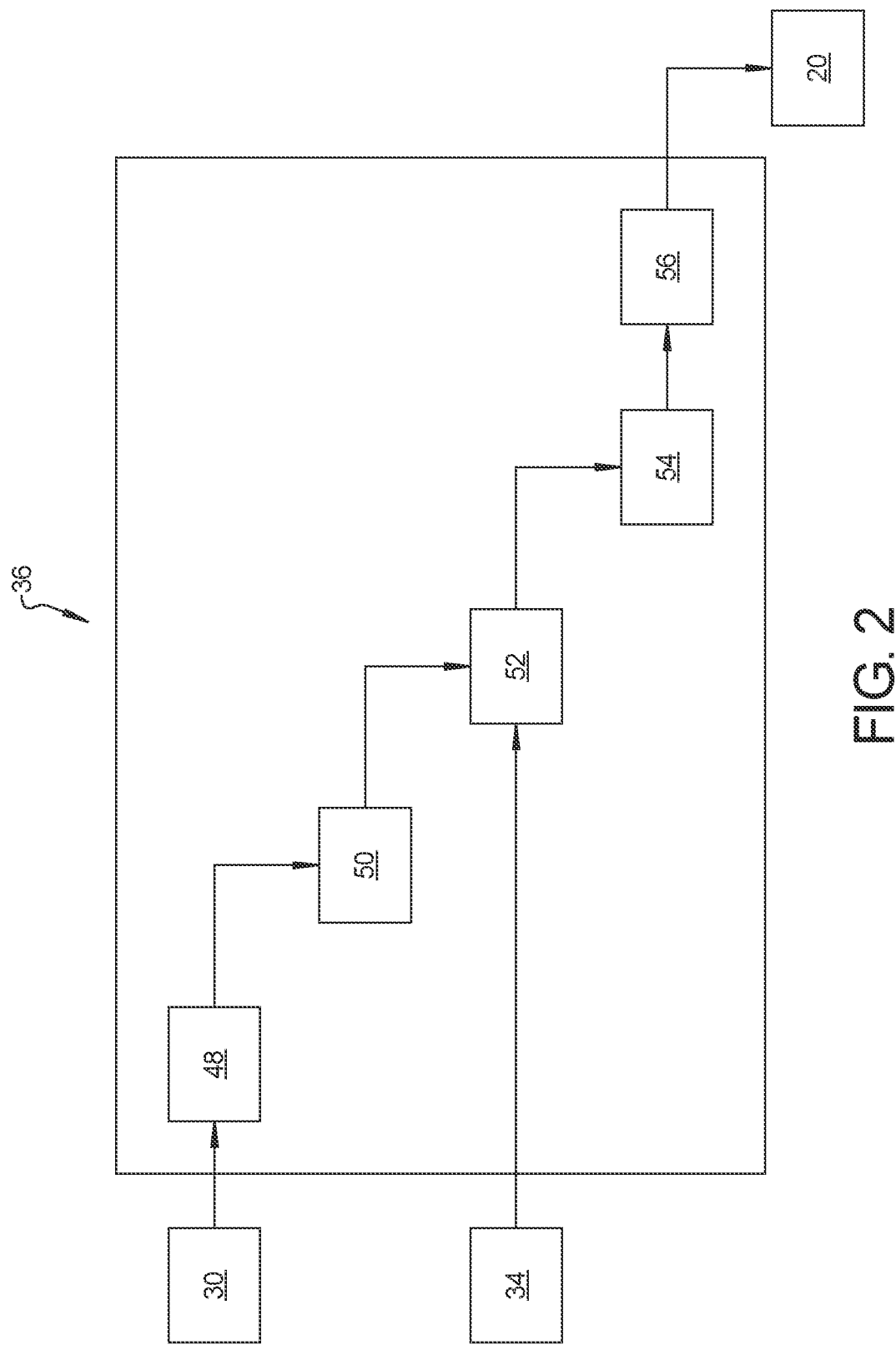
FIG. 2 is a flow diagram of a disturbance and reachability refiner module of the system of FIG. 1.

An output of the trajectory and motion planning module 32 including the reference trajectory and operation corridor 34 are sent to a disturbance and reachability refiner module 36 described in greater detail in reference to FIG. 2 below. The disturbance and reachability refiner module 36 also communicates with a relevant data planning module 38 which communicates with an offline database 40. The relevant data planning module 38 provides input data to an offline data-driven reachable set function learning module 42. The offline relevant data planning module 38, provided with data from the database 40, and the offline data-driven reachable set function learning module 42 perform pre-deployment analyses and output a supervised learning function 44 which is ported into the host vehicle 12 as described below. The offline data-driven reachable set function learning module 42 uses supervised learning algorithms to generate or learn a function that approximates computations performed using the supervised learning algorithms. An output of the offline data-driven reachable set function learning module 42 defines a mathematical object function ported into the host vehicle 12 for real-time deployment.

A refined trajectory and operation corridor 46 is produced by the combined online and offline data received by the disturbance and reachability refiner module 36. The refined trajectory and operation corridor 46 is forwarded to the computer 20, which communicates with the fusion module 24 which results in updates to the scene.

The computer 20 described in reference to FIG. 1 is a non-generalized, electronic control device having a preprogrammed digital controller or processor, memory or non-transitory computer readable medium used to store data such as control logic, software applications, instructions, computer code, data, lookup tables, etc., and a transceiver or input/output ports. The computer readable medium includes any type of medium capable of being accessed by a computer, such as read only memory (ROM), random access memory (RAM), a hard disk drive, a compact disc (CD), a digital video disc (DVD), or any other type of memory. The non-transitory computer readable medium excludes wired, wireless, optical, or other communication links that transport transitory electrical or other signals. The non-transitory computer readable medium includes media where data can be permanently stored and media where data can be stored and later overwritten, such as a rewritable optical disc or an erasable memory device. Computer code includes any type of program code, including source code, object code, and executable code.

Referring to FIG. 2 and again to FIG. 1, features and functions of the disturbance and reachability refiner module 36 are provided as follows. The baseline trajectory 30 is used to construct a baseline goal set 48. Data from the baseline goal set 48 is loaded into a reachability-based corridor module 50 wherein a collision checking logic is flipped, instead of avoided, to maintain the host vehicle 12 inside of a roadway corridor shown and described in reference to FIG. 3. The reachability-based corridor module 50 incorporates multiple different vehicle speeds, multiple different friction coefficients between the host vehicle 12 and the roadway, effects of unmodeled disturbances including wind, rain and the like. An output of the reachability-based corridor module 50 together with the reference trajectory and operation corridor 34 are fed into a corridor combining module 52, which incorporates data including roadway intersections. The corridor combining module 52 evaluates vehicle travel corridors to determine if travel is dynamically feasible and determines if the corridor data is robust including impacts of inclement weather.

Output data from the corridor combining module 52 is forwarded to a trajectory refinement module 54 to refine the baseline trajectory 30 using the reference trajectory and operation corridor 34 and applying the output of the corridor combining module 52. A refined trajectory and operation corridor 56 output by the corridor combining module 52 is then fed to the computer 20.

Figure 3:
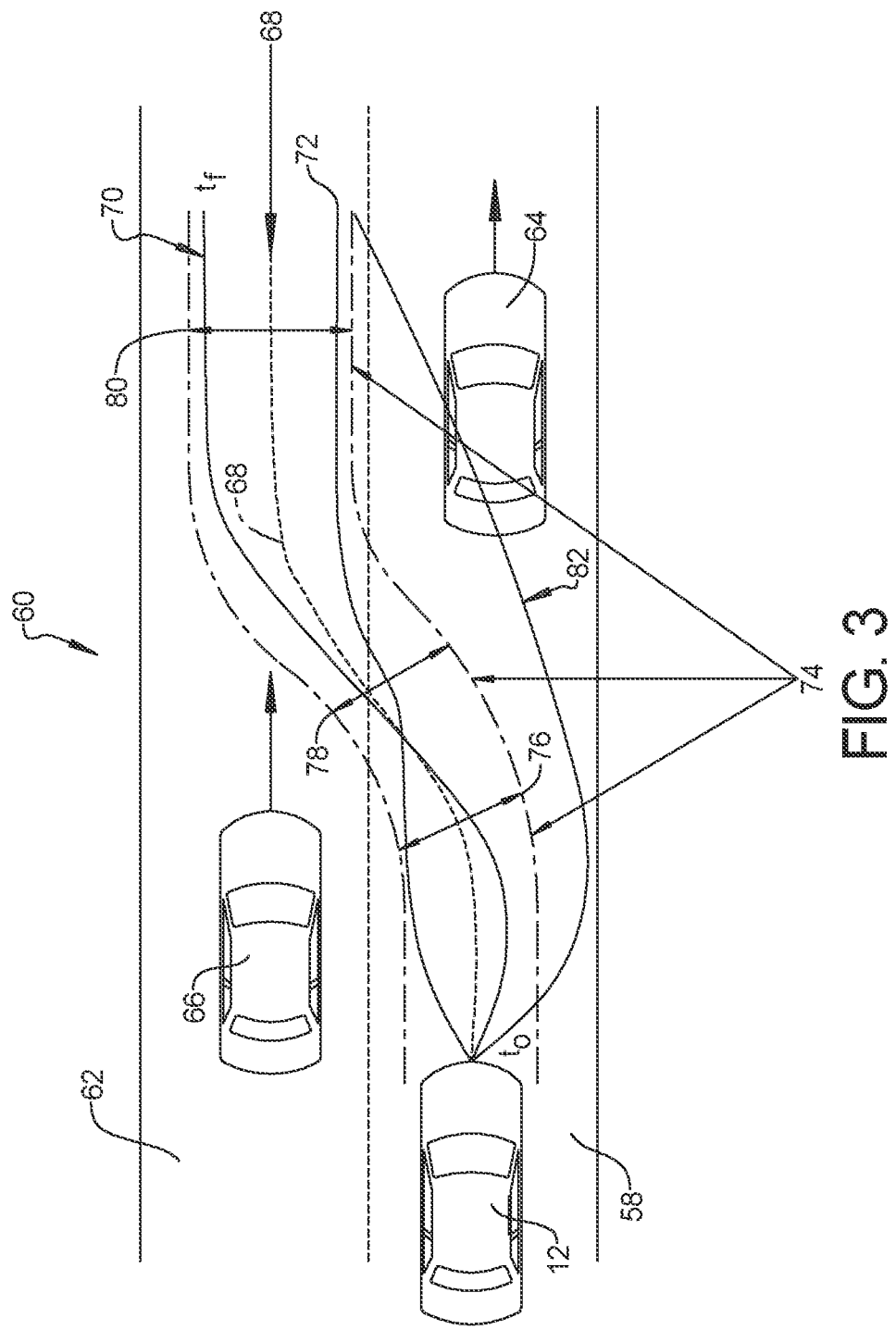
FIG. 3 is a plan view of an exemplary trajectory change operation for a vehicle using the system of FIG. 1.

Referring to FIG. 3, the host vehicle 12 is presented during travel in a first lane 58 of a multiple lane roadway 60. The vehicle trajectory planning system 10 operates to determine a path for the host vehicle 12 to take. For example only, the path may include a change from the first lane 58 to a second lane 62. According to the exemplary aspect shown, a second vehicle 64 is traveling in the first lane 58 in front of the host vehicle 12, and a third vehicle 66 is traveling in the second lane 62. To make the desired path change the host vehicle 12 calculates a baseline or an ideal path 68 which incorporates the baseline trajectory 30 extending in this example between the second vehicle 64 and the third vehicle 66 from a host vehicle start time $t_0$ identified in this example in the first lane 58 to a completion of the path change which in this example is in the second lane 62 at a final time $t_f$.

To accomplish the path change, multiple feasible trajectories are also calculated, with two exemplary feasible trajectories 70, 72 shown for clarity. To incorporate all of the available feasible trajectories, a guidance tube 74 is defined around the ideal path 68 which incorporates the multiple feasible trajectories at multiple points along the ideal path 68 considering distances to the other vehicles including in this example the second vehicle 64 and the third vehicle 66. The guidance tube 74 varies in width, for example including a first width 76 in front of the host vehicle 12, a second width 78 less than the first width 76 in a position between the second vehicle 64 and the third vehicle 66, and a third width 80 proximate to the host vehicle 12 when achieving the final time $t_f$. Multiple objectionable paths such as an exemplary objectional path 82 are also calculated which are not included in an envelope of the guidance tube 74.

Figure 4:
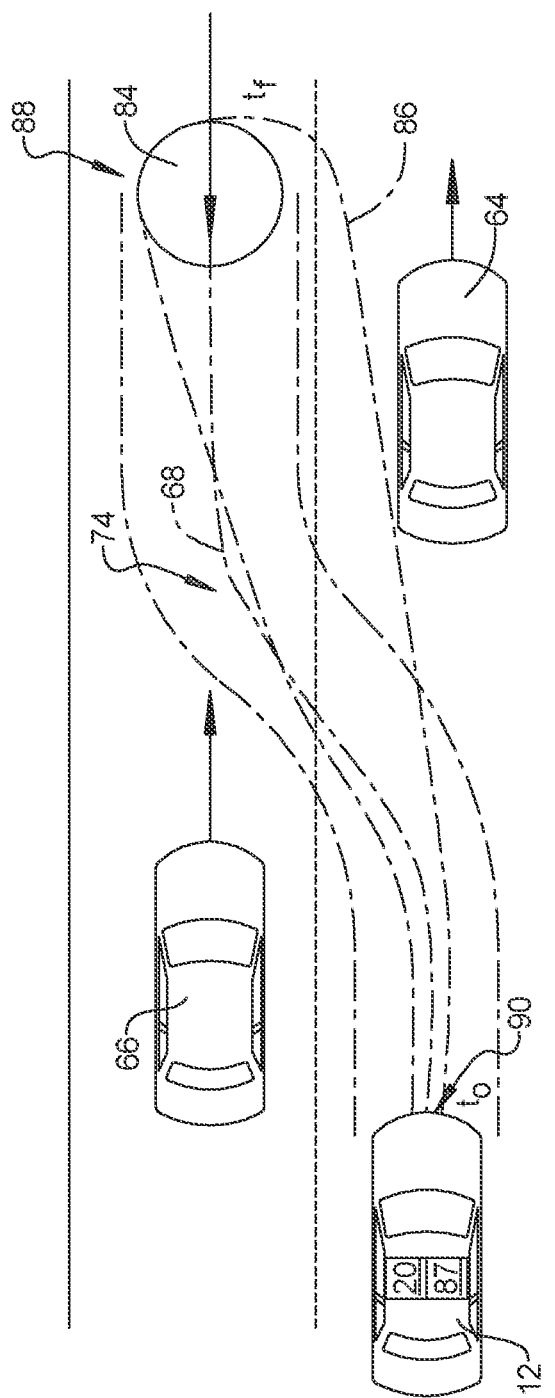
FIG. 4 is a plan view similar to FIG. 3 further showing a calculated reach corridor used by a host vehicle to reach a desired goal or target set.

Referring to FIG. 4 and again to FIGS. 1 through 3, in order to account for disturbances such as wind and local friction variations that occur during motion of the host vehicle 12 from the host vehicle start time $t_0$ to the final time $t_f$, an online real-time calculation is performed by the computer 20 to identify multiple baseline goal sets 84, after training and learning conducted offline as discussed below in reference to FIG. 5. The baseline goal sets 84 are computed online using road and lane information in real-time. The resulting baseline goal sets 84 are then used to compute online in real-time a reach corridor 86 using the offline trained function $f^{\Theta^*}(\bullet)$, which defines a backwards tube within which the host vehicle 12 may dynamically reach a desired goal or target set 88 despite and including the effects of the disturbances including wind, local friction variations and the like, working from the final time t back to the initial path change host vehicle start time $t_0$ defining a host vehicle path change start 90. The reach corridor 86 may be wider or narrower than the guidance tube 74 to accommodate the impacts of the disturbances. The host vehicle 12 is constrained to operate inside the reach corridor 86 during a path change operation to be robust to weather dependent disturbances.

Figure 10:
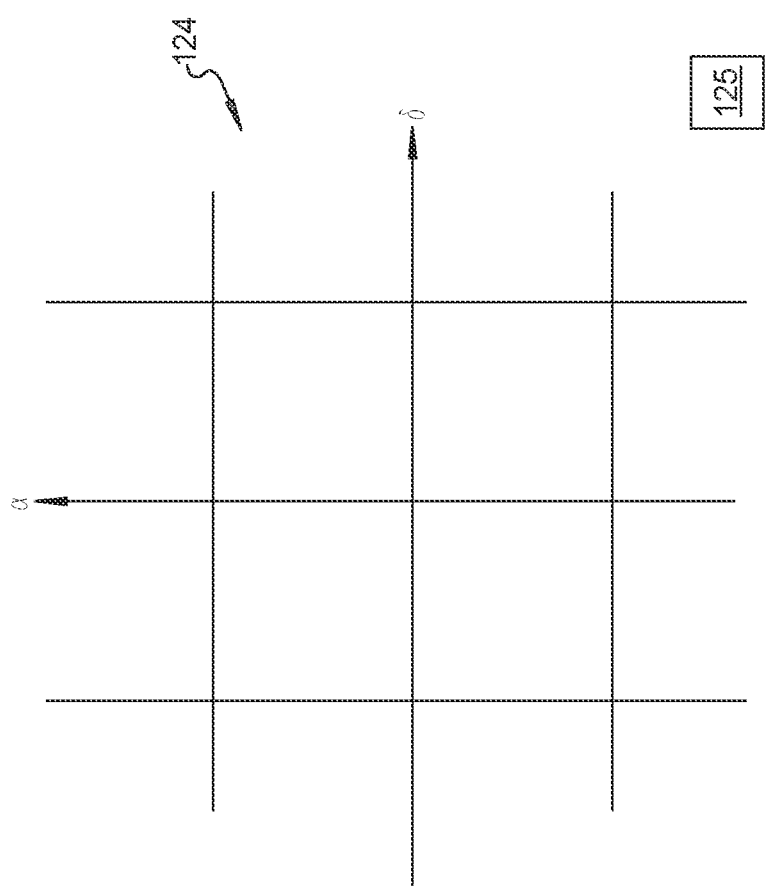
FIG. 10 is a graph of steering angle and longitudinal acceleration limits of vehicles used to train a function approximator responsible for computing backwards reachable datasets.

Generation of and learning required for the reach corridor 86 is performed using reach tools to generate a ground-truth and ground truth dataset 87 by the computer 20. The ground-truth is herein defined as information collected on location. Ground truth allows image data to be related to real features and materials on the ground. The collection of the ground truth dataset 87 allows calibration of remote-sensing data, and aids in interpretation and analysis of what is being sensed. Initially the baseline goal sets 84 are defined around the final state of the ideal path 68, then computations for the reach corridor 86 work backwards to the current time defining the initial path change host vehicle start time $t_0$. Environmental conditions including weights, inertias, time-steps and the like are applied. Ground-truth input/output sets are used to perform supervised learning such as the supervised learning function 44 which is connected to physics-informed learning. This is accomplished using sequential updates and then computing a backwards step to update a function approximator described in reference to FIG. 10 below.

Figure 5:
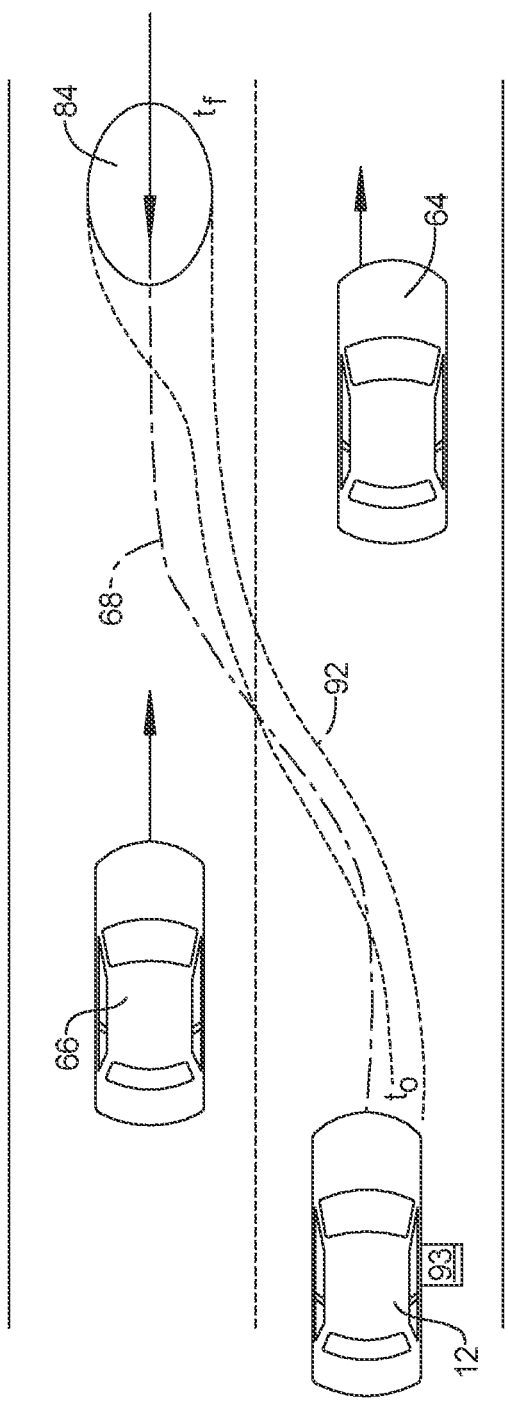
FIG. 5 is a plan view similar to FIG. 3 further showing a new operation corridor for a host vehicle.

Referring to FIG. 5, combining reachability and operation corridors an intersection of the operation corridor or guidance tube 74 with the inclement weather incorporated reach corridor 86 ensures congruence with respect to other vehicles as well as to provide robustness to disturbances, and further provides dynamic feasibility for analysis by a lower-level controller 93. A new operation corridor 92 defined as $\bar{C}$ is a collection of sets $C_i$ for i=1 ... N; Where $\bar{C} = \{C_1 \ldots C_N\}$. The new operation corridor 92 is then found using equation 1 below.

$\bar{C}$ =operation corridor⌒reach corridor     Equation 1

Referring to FIG. 6 and again to FIGS. 1 and 5, a minimally invasive and robust trajectory refinement may be performed. A dynamic feasibility constraint, such as [x(k+1)=Ax(k)+Bu(k)+wt] is provided in the backwards reach analysis. Because the reach corridor 86 is dynamically feasible by construction, it is not necessary to integrate the dynamics to obtain trajectory refinements or plans that stay within the new operation corridor 92. A newly designed or refined trajectory 94 is identified by sampling the baseline path also defined as the ideal path 68 at discrete points that correspond to time steps of the new operation corridor 92. The resulting output is a sequence of points that lie in the new operation corridor 92 and are used to generate the refined trajectory 94 sent to the computer 20. The refined trajectory 94 needs to remain inside the new operation corridor 92. The present approach therefore minimizes a route deviation with respect to the baseline trajectory 30, while staying within the new operation corridor 92.

Figure 6:
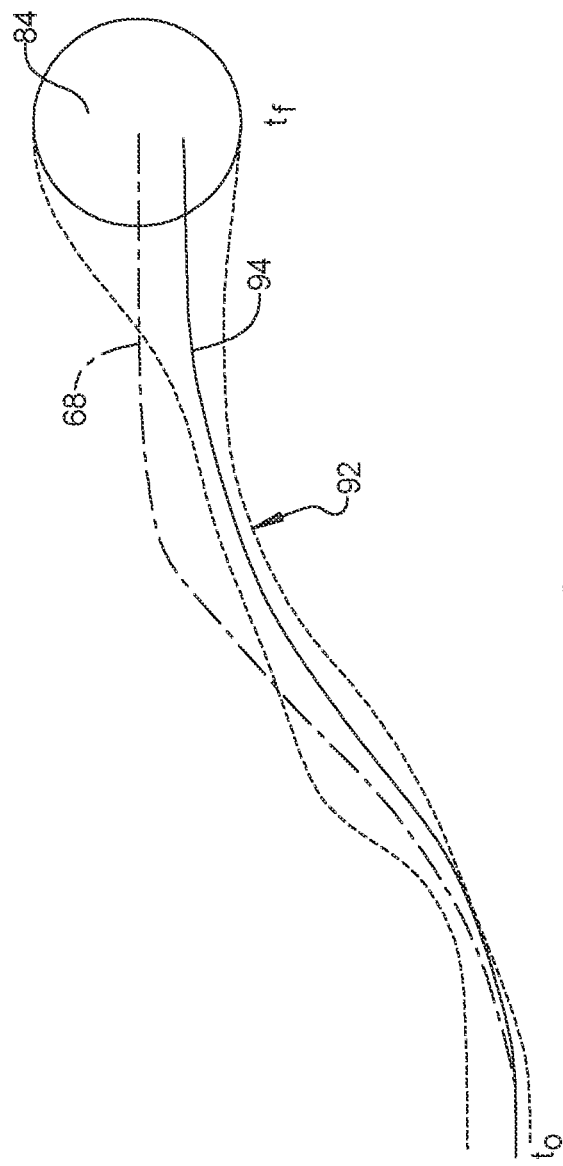
FIG. 6 is a plan view modified from FIG. 5 to show a refined trajectory positioned within the new operation corridor of FIG. 5.

If the baseline trajectory 30 is outside of the new operation corridor 92 at the locations of the time-stamps used to construct the operation corridor a convex optimization program is solved as shown in Equation 2 below. If the baseline trajectory 30 is not outside the new operation corridor 92 the ideal path 68 is fed to the computer 20 for trajectory planning.

min $J=\frac{1}{2}(x-\psi)^T(x-\psi)$, where:     Equation 2:

$x=[x(0), x(1), \ldots x(N)]^T$ $\psi=[\psi(0), \psi(1), \ldots, \psi(N)]^T$ $\Psi'(i) \in C_i$, I=1, ..., $n_c$ Referring generally to FIGS. 7 through 9 and again to FIGS. 5 through 6, given a specific vehicle (chassis) configuration, the offline process serves to configure the corresponding control formulation. The offline process compromises three elements. In a first element individual vehicle dynamics are modeled. The dynamics of the vehicles are modeled in a scene in the road defining a fixed frame which is road/scenario dependent.

Figure 7:
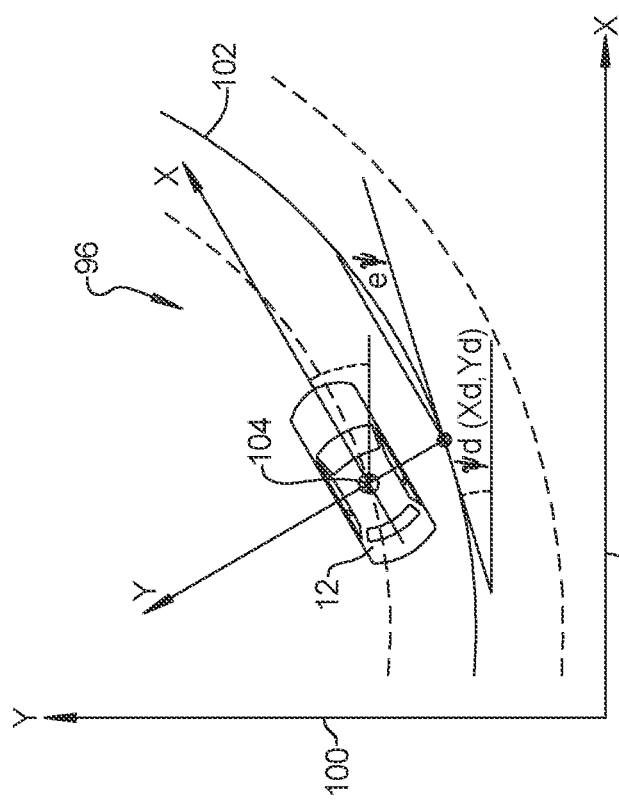
FIG. 7 is a graph presenting motions of the host vehicle with respect to an x-axis and a y-axis.

With specific reference to FIG. 7, a graph 96 presents motions of the host vehicle 12 with respect to an x-axis 98 and a y-axis 100. A vehicle motion with respect to a baseline 102 is determined based on a center axis 104 of the host vehicle 12.

Figure 8:
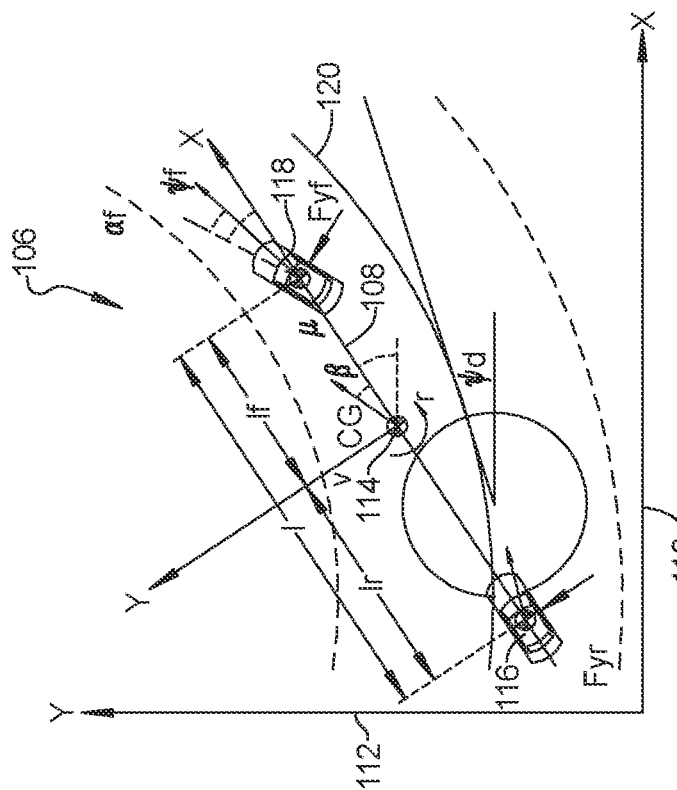
FIG. 8 is a graph depicting a bicycle model applied to model dynamics of individual vehicles and includes a linear tire model and a nonlinear tire model.

With specific reference to FIG. 8, a graph 106 presents motions of a bicycle model 108 with respect to an x-axis 110 and a y-axis 112. A bicycle model motion with respect to a bicycle model center axis 114 is determined. The bicycle model 108 is applied to model the dynamics of each vehicle and includes a linear tire model 116 and a nonlinear tire model 118 with respect to a baseline 120 and is identified in Equations 3 through 4 below.

Equations 3 and 4

$F_y =$ $\begin{cases} -C_a \tan\alpha + \dfrac{C_a^2}{3\xi\mu F_z}|\tan\alpha|\tan\alpha - \dfrac{C_a^3}{27\xi^2\mu^2 F_z^2}\tan^3\alpha, & |\alpha| < \alpha_{sl}, \\ -\xi\mu F_z \text{sgn}\alpha, & |\alpha| \geq \alpha_{sl} \end{cases}$ $\alpha_{sl} = \arctan\left(\dfrac{3\xi\mu F_z}{C_a}\right)$, Referring to FIG. 9 and again to FIGS. 7 and 8, in a second element of the offline process, relative vehicle dynamics modeling is performed. A perspective is shifted from absolute to relative states because a goal is to remain close to a trajectory defined by the ideal path 68 at all times. The host vehicle 12 travels along a nonlinear path 122. Next, the problem is discretized. Dynamical function parameter matrices will vary depending on the considered environmental conditions. The techniques used include a local linear approximation 123 of nonlinear tire forces, continuous-time (CT) relative state dynamics and dynamic-time (DT) linear approximation of dynamics at a constant velocity such as a given speed limit.

Figure 9:
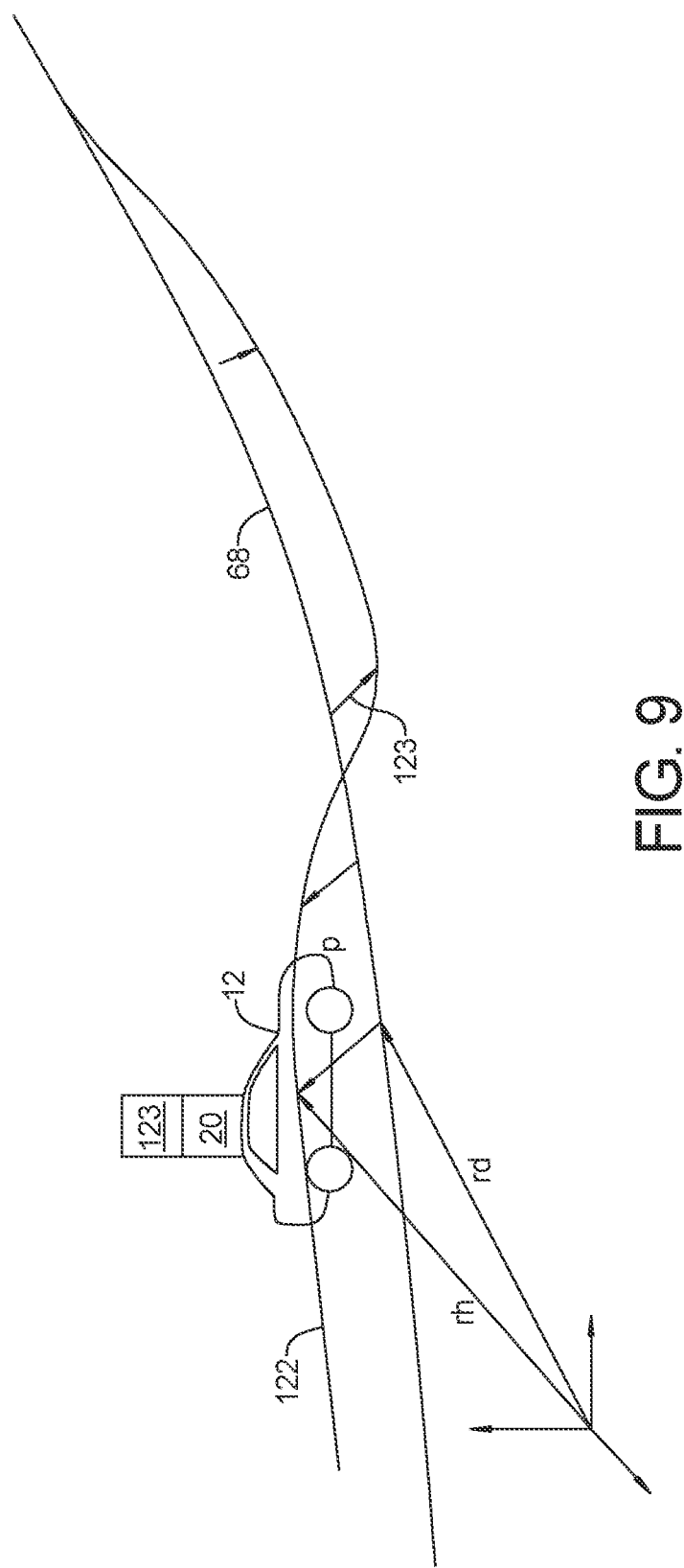
FIG. 9 is a nonlinear path traveled by the host vehicle generated using relative vehicle dynamics modeling.

Referring to FIG. 10 and again to FIGS. 7 through 9, in a third element of the offline process, a steering angle and longitudinal acceleration limits of the vehicles in a scene such as the second vehicle 64 and the third vehicle 66 are characterized. This data is used to train a function approximator 124 responsible for computing backwards reachable datasets 125 by the computer 20. The vehicles' steering systems are characterized using equation 5 below:

$\delta_k^{min} < \delta_k < \delta_k^{max}$ Steering range     Equation 5

The vehicles' powertrain and brake systems are characterized using equation 6 below:

$$a_k^{min} < a_k < a_k^{max} \text{ constraints on tractive and braking force} \quad \text{Equation 6}$$

In a fourth element of the offline process, inclement weather reachability corridor training is also conducted offline as follows. Given a sampling time and a horizon of interest, the vehicle trajectory planning system 10 learns how to approximate the backwards reachable datasets 125 computations offline based on input/output pairs or demonstrations. Kinematics-based sets are computed online because of model simplicity and low dimensionality. Dynamics-based sets are more complex, also making such a method appropriate for online deployment.

A region of desirable/acceptable longitudinal/lateral states is defined around and are relative to the baseline trajectory at the final time $t_f$ defining the baseline goal set 48 or a target set. The baseline goal set 48 is identified using equation 7 below:

$$\text{GoalSet} = \{(e_s, e_p) \in R^2 : e_{s,l} \le e_s \le e_{s,u}, e_{d,l} \le e_d \le e_{d,u}\}$$

$$\text{GoalSet} = \{x : Hx \le k\} \quad \text{Equation 7}$$

Next, a set of disturbances $\mathcal{W}$ based on an interval of coefficients of friction or other weather dependent road disturbances is constructed. For a range of environmental conditions, parameters, and operating domains, backwards reachable datasets 125 are computed using Equations 8 and 9 as follows if the model used is linear or a linearization of a nonlinear relative dynamics model. It is noted similar operations and math may be used for nonlinear models, such that equations 8 and 9 in the present example define specific embodiments of a more general mathematical operation.

$$\mathcal{R}_{k-1} = \{x_{k+1} \in X | \exists u_k \in \mathcal{U}, x_{k+1} = A_k x_k + B_k u_k + w, x_N \in \text{GoalSet}, w \in W\} \quad \text{Equation 8}$$

$$\mathcal{R}_{k-1} = A_k^{-1}((\mathcal{R}_K \ominus \mathcal{W}) \oplus B_k \mathcal{U})) \quad \text{Equation 9}$$

Using the following input/output mappings, the ground-truth data is generated. A supervised learning algorithm is setup to learn an approximation of the underlying backwards reachable datasets 125 computation for the parameter set considered. Equations 10 and 11 below are used.

$$\mathcal{R}_{k-1} \approx f^\theta(\mathcal{R}_k, \mathcal{U}, \mathcal{W}) \quad \text{Equation 10}$$

$$\text{vec}(R_{k+1}) \approx f^\theta(\text{vec}(R_k), \text{vec}(U), \text{vec}(\mathcal{W})) \quad \text{Equation 11:}$$

Infer that $\theta^*$ results in the best approximation. Then $f^{\theta^*}(\cdot)$ may be used online. This allows consideration of live environmental conditions and is more memory efficient.

Figure 11:
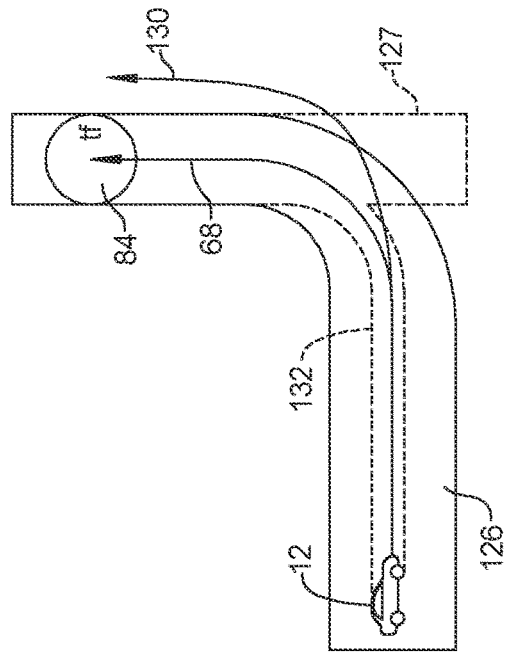
FIG. 11 is a plan view of an exemplary roadway having an icy patch representing a potential change in friction at a 90-degree turn.

Referring to FIG. 11, the host vehicle 12 is modeled traveling on an exemplary roadway 126 along the ideal path 68 using the baseline goal set 48, with the exemplary roadway having an icy patch 127 representing a potential change in friction present at a 90-degree turn 128. Without sufficient anticipation of this potential change in the road condition and/or enough tracking control the host vehicle 12 may swerve off the roadway 126 along an off road path 130 if driving friction is not included in the trajectory planning of the host vehicle 12.

Referring to FIG. 12 and again to FIG. 11, the host vehicle 12 is again modeled traveling on the exemplary roadway 126 along the ideal path 68 aiming to reach the baseline goal set 84. To reduce the possibility of the host vehicle 12 swerving off the roadway 126 and therefore leaving a reachability corridor along the off-road path 130 due to the icy patch 127 a data-driven reach set for hypothetical frictions using a dynamics related baseline generates a modified travel path 132 to follow.

Figure 12:
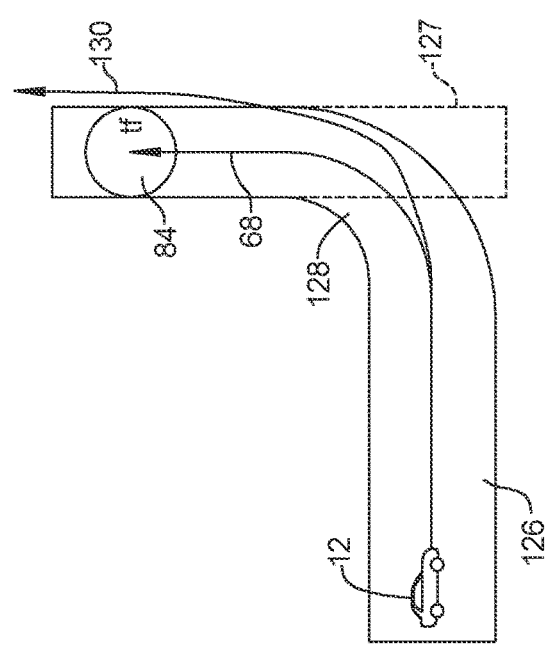
FIG. 12 is a plan view of the exemplary roadway of FIG. 11 modified to include a data-driven reach set using a dynamics related baseline which generates a modified travel path with the host vehicle leaving a reachability corridor resulting in the host vehicle leaving the roadway.
Figure 13:
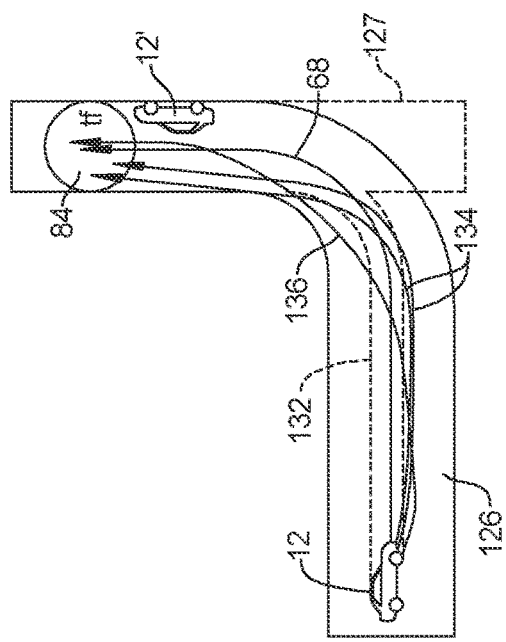
FIG. 13 is a plan view modified from FIG. 12 wherein vehicle control limits including steering angle and acceleration providing multiple possible travel paths including a principal travel path which constrains vehicle motion.

Referring to FIG. 13 and again to FIGS. 11 and 12, the host vehicle 12 is again modeled traveling on the exemplary roadway 126 along the ideal path 68 using the baseline goal set 48. To avoid the host vehicle 12 swerving off the roadway 126 along the path 130 due to the icy patch 127 the data-driven reach set for hypothetical frictions using the dynamics related baseline generates the modified travel path 132 to follow. The modified travel path 132 includes vehicle control limits including steering angle and acceleration to constrain the trajectory by providing multiple potential travel paths 134 including a principal travel path 136 which constrains vehicle motion within the modified travel path 132 to permit the host vehicle identified as host vehicle 12' to arrive at the final time $t_f$ defining the goal set or baseline goal set 48 without or with minimized loss of friction.

According to several aspects, the method of the present disclosure is based on the backwards reachable datasets 125 computations. A learning framework enables computation of reach sets online using a function approximator such as a neural network (NN), that considers linear and nonlinear tire dynamics. An algorithm combines operation corridors with reachability corridors that is real-time deployable. A trajectory refinement algorithm makes use of the reachability corridors that is also real-time deployable.

The following steps may be performed by the vehicle trajectory planning system 10. The reachable set function learning module 42 receives the ground truth dataset 87 representing the backwards reachable datasets 125 given a range of miscellaneous training parameters and a variety of baseline goal sets 84. The baseline goal sets 84 are defined a-priori as acceptable or sufficient deviations in terms of a vehicle lateral position and a vehicle longitudinal position and velocity differences with respect to an ideal final position and an ideal velocity. A "disturbance" set is calculated based on ranges of disturbance accelerations, including maximum and minimum acceleration errors due to maximum and minimum variations in road coefficients of friction, maximum and minimum wind speed impact on wind-related forces or accelerations, and the like. The disturbance sets are then used to compute a set of states that may successfully reach a final goal set within a horizon of interest between a current (or initial) time and a final planning time. In discrete-time, a time index such as k=0, 1, 2, ..., N is given, where: k=0 represents an initial time and k=N represents a final time.

The sets of states are computed with an assumed kinematics or dynamics model along with all of the above noted parameters. By applying this data for a large variety of cases, disturbance ground-truth reachability corridors may be computed and a supervised learning algorithm is applied to infer a function that mimics these computations.

The convergence criterion represents a threshold difference or accuracy between the predicted output of the learned function and the ground-truth output of the analysis. Finally, the learned function is stored and deployed on the host vehicle 12 so that at vehicle run-time the host vehicle 12 may compute the disturbance ground-truth reachability corridors in real-time.

A supervised learning module of the present disclosure is trained by first computing the ground-truth reachable sets or operation corridors over a range of environment, disturbance, and vehicle parameters. The learning algorithm iteratively outputs and compares the predicted set with the ground truth set and makes adjustments to a function until the outputs are "close" enough together whereby a predefined convergence criterion is achieved.

The vehicle trajectory planning system 10 constrains the computer or planner based on inclement weather parameters. The vehicle trajectory planning system 10 is provided with an operation corridor that includes the effects of inclement weather in the motion of the host vehicle 12. This permits adverse road conditions to be anticipated in the trajectory fed to the computer 20, thereby reducing a quantity of aggressive maneuvers and ensuring a smooth and robust drive event.

An architecture and methodology of the real-time motion planning is provided with extra constraints due to inclement weather conditions. An algorithm computes dynamically feasible states in adverse weather conditions. The algorithm detects non-congruent conditions that require re-planning of a host vehicle's path and motions. The algorithm also generates minimally invasive robust re-plans.

A vehicle trajectory planning system 10 of the present disclosure offers several advantages. These include a methodology for enhancement of current planning methods to be dynamically feasible and robust to changing road conditions/inclement weather/disturbances, while maintaining recommended distances to other vehicles. The planner or computer is constrained based on local disturbances and provides a control system with an updated trajectory and operation corridor. Data-driven reachable set computations are employed by learning set mappings offline using supervised learning. Online, an approximating function is used to compute the operation corridor for the host vehicle to remain inside of. The system 10 improves robustness to disturbances while respecting distance constraints to other vehicles; allows for improved environmental condition monitoring; provides improved memory efficiency; and provides real-time deployment.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vehicle trajectory planning system, comprising:
a perception system of a host vehicle collecting information from multiple sources and communicating with a computer;
a fusion module fusing scene information from a map and perception items identified by the perception system;
a behavior planning module receiving an output of the fusion module and producing a host vehicle baseline trajectory;
a trajectory and motion planning module receiving the output of the fusion module in parallel with the behavior planning module, the trajectory and motion planning module determining a reference trajectory and an operation corridor for a host vehicle;
a disturbance and reachability refiner module receiving an output of the trajectory and motion planning module including the reference trajectory and the operation corridor; and
an algorithm applied to adjust and re-plan the host vehicle baseline trajectory to be robust to a range of exogenous disturbances acting on the host vehicle.

2. The vehicle trajectory planning system of claim 1, including a relevant data planning module communicating with an offline source defining a database to retrieve and calculate set disturbance information and to communicate with the disturbance and reachability refiner module.

3. The vehicle trajectory planning system of claim 2, including an offline data-driven reachable set function learning module receiving input data from the relevant data planning module including set disturbance information, the offline data-driven reachable set function learning module using supervised learning algorithms to generate or learn a function approximating computations performed using the supervised learning algorithms; wherein an output of the offline data-driven reachable set function learning module defines a mathematical object function ported into the host vehicle for real-time deployment.

4. The vehicle trajectory planning system of claim 3, further including a refined trajectory and a refined operation corridor produced by combined online and offline data received by the disturbance and reachability refiner module, the refined trajectory and the refined operation corridor being forwarded to the computer, the computer communicating with the fusion module to further aid in processing of the scene information.

5. The vehicle trajectory planning system of claim 1, further including a baseline goal set receiving the vehicle baseline trajectory and incorporating data including roadway intersections.

6. The vehicle trajectory planning system of claim 5, including a reachability-based corridor module having the baseline goal set loaded into the reachability-based corridor module and wherein a collision checking logic is flipped to maintain the host vehicle inside of a roadway operation corridor; and wherein the reachability-based corridor module incorporates multiple different vehicle speeds, multiple different friction coefficients between the host vehicle and a roadway and effects of unmodeled disturbances including wind and rain.

7. The vehicle trajectory planning system of claim 6, including a corridor combining module having an output of the reachability-based corridor module together with the reference trajectory and the roadway operation corridor fed into the corridor combining module, the corridor combining module evaluating vehicle travel corridors to determine if travel is dynamically feasible and determining if an operation corridor data is robust to impacts of the exogenous disturbances including inclement weather.

8. The vehicle trajectory planning system of claim 7, including a trajectory refinement module receiving output data from the corridor combining module to refine the host vehicle baseline trajectory using the reference trajectory and the roadway operation corridor and applying an output of the corridor combining module, a refined trajectory and a refined operation corridor output by the corridor combining module being fed to the computer wherein the algorithm applied to adjust and re-plan the host vehicle baseline trajectory combines the roadway operation corridor with a reachability corridor in real-time.

9. The vehicle trajectory planning system of claim 1, including a learning framework enabling computation of reach sets online using a function approximator that considers linear and nonlinear tire dynamics.

10. The vehicle trajectory planning system of claim 1, wherein the multiple sources include a vehicle camera and at least one sensor defining a radio detection and ranging (RADAR) sensor and a light detection and ranging (LIDAR) sensor.

11. A method to apply data driven reachability corridors in vehicle trajectory planning, comprising:
- determining a path for a host vehicle to take;
- calculating an ideal path incorporating a baseline trajectory from an initial host vehicle start time $t_0$ to a completion of a path change at a final time $t_f$;
- calculating multiple feasible trajectories of the host vehicle;
- defining a guidance tube around the ideal path incorporating the multiple feasible trajectories at multiple points around the ideal path considering multiple distances to proximate vehicles;
- performing an online real-time calculation by a computer to identify multiple baseline goal sets; and
- forming a reach corridor within which the host vehicle dynamically reaches a desired target set of the multiple baseline goal sets including wind and local friction variations and working from the final time $t_f$ back to the host vehicle start time $t_0$ defining a host vehicle start state.

12. The method of claim 11, further including generating a learning module for the reach corridor using reach tools to produce a ground-truth and a ground truth dataset by the computer.

13. The method of claim 12, further including initially defining the baseline goal sets around a final state of the ideal path, then working computations for the reach corridor backwards to the initial state of the host vehicle at the start time $t_0$.

14. The method of claim 11, further including using ground-truth input/output sets to perform supervised learning including a supervised learning function connected to physics-informed learning, accomplished using sequential updates and computing steps to update a function approximator set of parameters.

15. The method of claim 11, further including combining the reach corridor and an operation corridor at an intersection of the guidance tube with a disturbance incorporated reach corridor to provide robustness to mismodeling of dynamics, including disturbances or perturbations acting on the host vehicle.

16. The method of claim 11, further including:
- performing a minimally invasive trajectory refinement retaining dynamic feasibility properties via the backwards reach analysis; and
- identifying a refined trajectory by minimizing error with respect to the ideal path based on samples at discrete points corresponding to time steps of the new operation corridor.

17. The method of claim 11, further including computing the baseline goal sets and multiple reachable sets using $f^{\theta*}(\cdot)$ online in real-time accounting for a disturbance set W after training and learning $f^{\theta*}(\cdot)$ offline to account for disturbances including wind and local friction variations occurring during motion of the host vehicle from the start time $t_0$ to the final time $t_f$.

18. A method to apply data driven reachability corridors in vehicle trajectory planning, comprising:
- calculating an ideal path for a host vehicle incorporating a baseline trajectory in a host vehicle computer;
- loading an output of a trajectory and motion planning module including a reference trajectory and an operation corridor into a disturbance and reachability refiner module;
- applying data-driven reachable set computations by learning set mappings offline using supervised learning;
- applying an approximating function online, applying the reference trajectory and the operation corridor to compute a reachability corridor for the host vehicle to remain inside of during a maneuver of the host vehicle; and
- updating the reachability corridor while constraining the host vehicle computer based on local disturbances using the disturbance and reachability refiner module including changing road conditions, inclement weather and roadway disturbances.

19. The method of claim 18, further including:
- retrieving and calculating set disturbance information from offline sources including a relevant data planning module in communication with a database;
- generating a supervised learning function and communicating the supervised learning function to the disturbance and reachability refiner module; and
- providing input data to an offline data-driven reachable set function learning module from the relevant data planning module.

20. The method of claim 19, further including:
- applying ground-truth input/output sets to perform supervised learning including a supervised learning function which is connected to physics-informed learning using sequential updates;
- computing steps to update a function approximator; and
- conducting inclement weather reachability corridor training offline given a sampling time and a horizon of interest and learning to approximate reachable dataset computations offline based on input and output pairs or demonstrations.

* * * * *